United States Patent Office 3,557,626
Patented Jan. 26, 1971

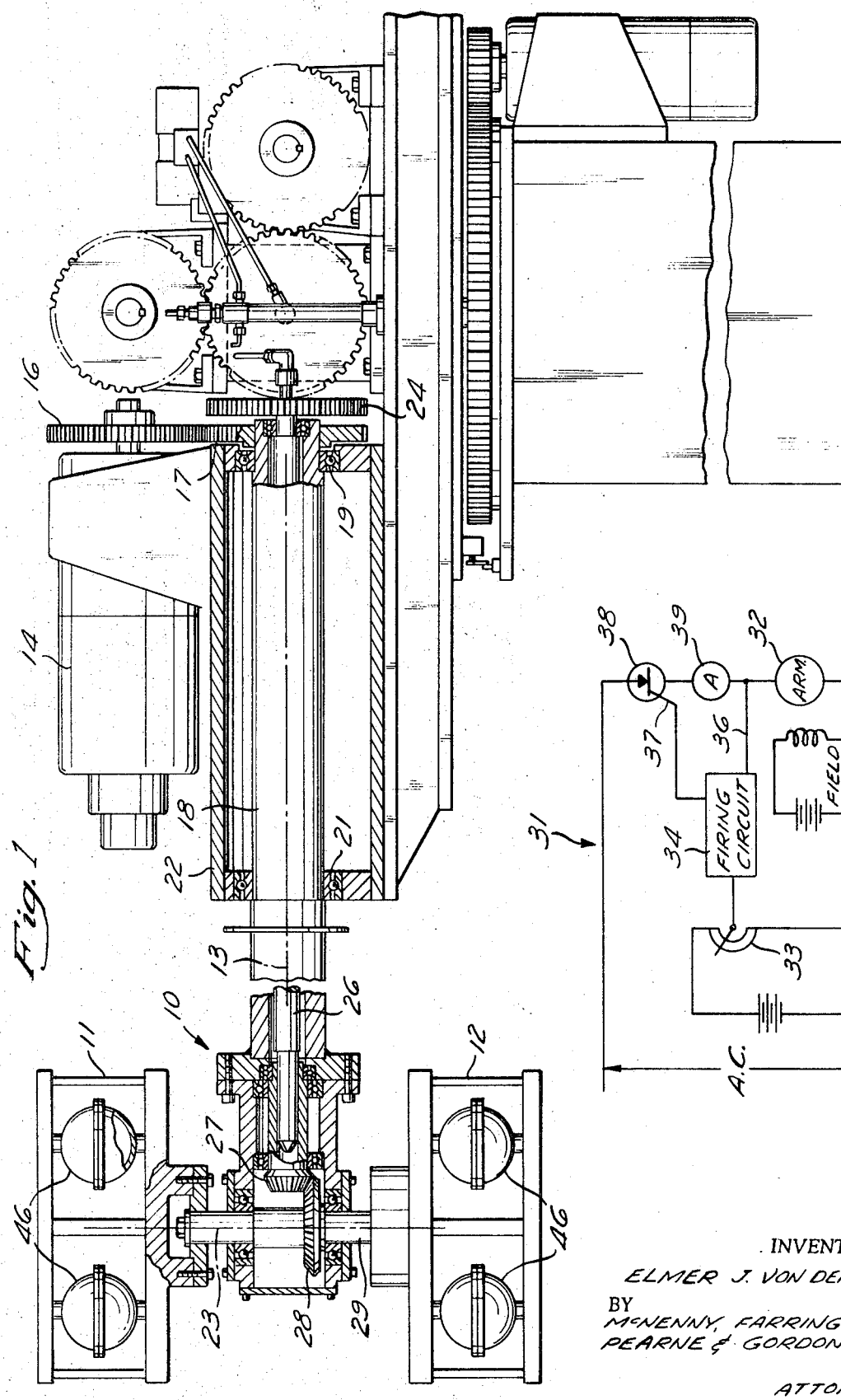
Jan. 26, 1971 — E. J. VON DER HEIDE — 3,557,626
BALANCE INDICATOR AND METHOD
Filed May 13, 1969
INVENTOR.
ELMER J. VON DER HEIDE
BY McNENNY, FARRINGTON,
PEARNE & GORDON
ATTORNEYS

3,557,626
BALANCE INDICATOR AND METHOD
Elmer J. von der Heide, 257 Atterbury Blvd.,
Hudson, Ohio 44236
Filed May 13, 1969, Ser. No. 824,095
Int. Cl. G01m 1/22
U.S. Cl. 73—462
6 Claims

ABSTRACT OF THE DISCLOSURE

A balance indicator associated with each rotational axis of a casting machine comprising an ammeter in the power circuit of each drive motor to automatically indicate motor load, and therefore the magnitude of an unbalanced load and its angular position with respect to such axis.

BACKGROUND OF THE INVENTION

This invention relates to an improvement in rotational casting machines and, more particularly, to a means of determining an out-of-balance condition of a mold or mold assembly mounted for rotation on such machines.

A rotational casting machine, as its name implies, is designed to rotate a hollow mold containing a liquid or liquifiable plastic in the course of producing a formed, plastic article in the mold. The mold generally comprises two or more mold sections which cooperate when joined to define a closed surface representing the exterior surface of the article being cast. During the molding operation, the mold is continuously rotated in order that the entire internal mold surface will be coated by the plastic material under the influence of gravity. To insure that the entire closed surface of the mold will be properly coated, it is desirable to employ a mold-carrying spindle which is capable of rotating a mold or molds about two angularly related axes.

When the center of gravity of a mold or mold combination does not lie on an axis of rotation and the axis of rotation is not vertical, the associated motor drive for the axis must repeatedly raise and lower the resulting unbalanced load. It is not always possible, at first, to mount the mold or mold combination to the spindle in such a manner that the center of gravity of each rotated assembly lies on the axes about which it is rotated. This results from the fact that the weight of individual molds often varies, that an individual mold may not easily be positioned accurately with respect to such axes, and that many times the mold will not be symmetrical and its center of gravity will be difficult to determine.

To keep spindle torque and horsepower requirements within reasonable limits, it is desirable to balance each mold or mold combination with respect to its rotational axes. This is usually accomplished after the mold has been mounted on the mold-carrying spindle and positioned as accurately as is reasonably possible. To bring the machine within a tolerable balance, weights are usually then manually added to the mold or spindle as required. To determine where and how much weight should be added, it has been a common practice in the past to disconnect the drive of each rotational axis so the driven assembly could be freely spun by hand. This has been necessary to eliminate the drag and inertia of the drive motor and gears in order that the unbalance might be manually sensed more easily. It has usually involved pulling associated drive gears or rollers out of mesh.

SUMMARY OF THE INVENTION

Typically, the mold supporting spindle of a rotational casting machine is provided with individual electric motors to rotate a mold about two rotational axes. Accordingly, this invention provides a means of sensing an unbalanced load on each axis through the associated electric motor circuit. More particularly, this invention utilizes an ammeter in the power circuit of each spindle drive motor to detect an unbalanced load.

A spindle drive motor must lift any unbalanced load if it is rotating the mold about a horizontal axis or a nonvertical axis which necessarily includes a horizontal component. After the load has been lifted to the high point in its rotation about such an axis, it will tend to drive or overrun the associated spindle drive motor as it travels about the downward side of its rotational path. The resultant alternating load on the spindle motor will be indicated by a fluctuation of the needle of the respective ammeter. That is, motor current will be at a maximum when a motor is lifting the unbalanced load and at a minimum when the load is being moved in the direction of gravity.

When the meter fluctuation indicates a harmful degree of unbalance, the operator may proceed to balance the machine. This is usually accomplished by adding weight to the light side of the mold spindle assembly. The spindle assembly may also be balanced by other methods such as shifting a weight or mold so as to modify its moment-arm about an axis and minimize the total or resultant mass moment-arm product about such axis. Since movement of the mold about its rotational axes is normally slow enough to be followed by the unaided eye of an operator, he may determine the light side of the spindle and mold assembly by observing which side is being elevated when the motor current is at a minimum. Once the light side of the mold assembly has been identified, the operator may stop the machine and add weight to the proper point of the assembly.

It should be understood from the foregoing that the degree of unbalance and its location may be determined by simply watching both an ammeter and the mold assembly. The amplitude of the ammeter needle oscillation will be proportional to the amount of load unbalance and the minimum meter reading will occur when the light side of the mold assembly is being raised. Thus, the time consuming procedure, as commonly followed in the past, of separately disconnecting the individual axis drives to manually sense the load unbalance is no longer necessary.

The advantages of the present invention may be more fully appreciated when the interdependence of the balance along each axis is understood. According to common rotational casting machine design, a mold-supporting spindle is arranged such that weight added to balance a load on one axis will necessarily cause a change in balance of the load on the other axis. Oftentimes this effect will require that the first axis balanced must be rebalanced because of a correction on the second axis. The immediate balance indication provided by this invention is obviously helpful during such rebalancing procedures since each axis drive need not be repeatedly disconnected and connected to determine balance conditions.

BRIEF DESCRIPTION OF THE DRAWINGS

FIG. 1 is a cross-sectional view of the mold-carrying spindle and drive means of a rotational casting machine with which this invention may be employed.

FIG. 2 is a schematic circuit diagram representing the power circuit of a typical spindle axis drive motor.

DESCRIPTION OF THE PREFERRED EMBODIMENT

FIG. 1 shows a mold-carrying spindle assembly 10 on which is mounted a mold assembly which in this instance has been shown as a set of opposed subassemblies 11 and 12. The subassemblies 11 and 12 are spaced about a horizontal major rotational axis 13 of the spindle assembly 10. A drive motor 14 is arranged to drive the mold assembly about the major axis 13 through a set of spur gears 16 and 17. An outer cylinder 18 driven by the spur gear 17 supports the mold assemblies 11 and 12 for rotation about the major axis 13. The spindle assembly 10 is supported for rotation by bearings 19 and 21 mounted in a spindle housing 22.

The mold assemblies 11 and 12 are likewise mounted for rotation about a second or minor axis 23. A second motor (not shown) is provided to drive the mold assemblies 11 and 12 about this secondary axis 23 by driving a spur gear 24 which in turn drives an inner shaft 26. Secured to the inner shaft 26 at its outer end is a bevel gear 27 which drives a mating gear 28. The mating gear 28 drives the mold assemblies about the secondary axis 23 through an associated shaft 29. It should be understood that rotation of the outer cylinder 18 will rotate the secondary axis 23 out of the illustrated vertical position. For a more complete and detailed description of the illustrated rotational casting machine reference may be made to my copending patent application Ser. No. 720,700, filed in the United States Patent Office on Apr. 11, 1968.

Absolute rotational speed of the mold assemblies 11 and 12 about the major and minor axes 13 and 23 and relative rotational speeds between these axes will depend on a particular molding operation. Typically, speed about these axes will be in the order of 10 r.p.m. Relative speed between these axes may depend, for example, on the configuration of a particular mold or molds. For this reason, separate variable speed drive motors for each axis of mold rotation are provided.

FIG. 2 shows a schematic circuit diagram 31 which is adapted to control the speed of a spindle drive motor. The armature 32 represents the armature of the spindle drive motor 14 associated with the major axis 13. An identical circuit (not shown) would be associated with the drive motor for the minor axis 23.

The circuit 31 provides half-wave rectification of an AC power source to drive the DC shunt motor 14. Motor speed may be regulated by adjusting a potentiometer 33. This potentiometer adjustment provides a reference voltage signal proportional to the desired rotational speed of a spindle drive motor. The counter-electromotive force on the motor armature 32, which is a direct measure of motor speed, is transmitted or fed back to the firing circuit 34 by the feedback conductor 36. The counter-electromotive force or EMF is compared in this firing circuit 34 with the reference voltage supplied by the potentiometer 33. The firing circuit 34 adjusts the voltage on the gate 37 of the SCR 38 to adjust the angle of conduction during each positive half cycle until the counter-EMF matches the reference voltage to maintain the desired motor speed. The circuit will maintain a relatively constant spindle speed independent of moderate load fluctuations. Constant speed is necessary to achieve uniform casting, but, as a result, balance conditions are not indicated by cyclic speed variation.

The balance indicator circuit of this invention is shown in FIG. 2 wherein an ammeter 39 is connected in series with the armature 32 of the spindle drive motor 14. It can be seen that the ammeter 39 will indicate the average current passing through the armature 32. The average value of the current through the armature 32 of the motor 14 is a direct measure of the torque required to rotate the mold assemblies 11 and 12 about the major axis 13. Similarly, the average current through the other drive motor (not shown) associated with the minor axis 23 indicates the torque required for rotation about the minor axis. Torque requirements, neglecting bearing and gear losses, are a direct function of an unbalanced load.

Thus, an ammeter will indicate when the mold assembly is too far out of balance immediately after the mold is "set up" or mounted on the spindle assembly without the necessity of disconnecting the associated spindle drive train. Normally, the mold assembly will be balanced at the same machine station where the mold is "set up." The ammeters may be mounted in view from this station so that the operator may observe both the rotation of the mold assemblies and the needles of the ammeters. As mentioned above, the magnitude and angular position of an unbalanced load may be determined by watching the mold assembly and ammeters.

When a mold assembly is substantially out of balance with respect to either of its rotational axes 13 or 23, a spindle drive motor may be overloaded to a point of failure. Economic and space considerations limit the practical horsepower capacity of spindle drive motors.

Each mold subassembly 11 and 12 may include a plurality of separate, symmetrical molds 46. It may be seen from FIG. 1 that either the major axis 13 or minor axis 23 may be out of balance due to variations in placement or weight of the individual molds 46. The difficulty of accurately determining and positioning the center of gravity of an unsymmetrical mold or mold assembly, moreover, would add to initial balancing problems. When the mold assemblies 11 and 12 are rotated about the major axis 13 from the vertical position shown in FIG. 1, an unbalance between the assemblies about this axis will be felt by the spindle drive motor 25. Additionally, it may be seen that an unbalance about the minor axis 23 will be felt by the associated spindle drive motor (not shown) when the minor axis 23 is rotated out of its vertical position by rotation of the outer cylinder 18.

When a balancing weight is added to the right or left-hand side of either mold subassembly 11 or 12 to correct for an unbalance on the minor axis 23, it will cause a direct change in the balance about the major axis 13. From this it may be appreciated that the balance indicator of this invention is highly desirable. It will give an immediate indication of the effect of a balance correction for one axis on the other axis. This is a substantial improvement over the older manual sensing techniques which allowed the sensing of only on axis at a time.

The motor control circuit as shown in FIG. 2 represents a preferred arrangement by which spindle motor speed may be adjusted and accurately maintained independent of moderate load changes. It should be understood, nevertheless, that variations and modifications of the motor control circuitry and components may be made without departing from the principles of this invention. For example, motor speed could be regulated by such means as a rheostat, an autotransformer, or a frequency control depending upon the type of motor used. Of course, the ammeter would be placed in the field circuit of an induction motor if such a motor were used. Moreover, in motor control circuits which vary the duration of voltage pulses or the magnitude of a constantly applied voltage to maintain a desired speed, a voltmeter may be used to detect variations in power requirements during a rotational cycle in much the same manner as the ammeter 39 indicates such variations. Further, it is not critical to this invention that a spindle drive motor be speed adjustable.

What is claimed is:

1. A rotational casting machine including a spindle assembly adapted for mounting a mold assembly thereon, said spindle assembly being arranged to rotate the mold assembly about at least one non-vertical axis, an electric motor means adapted to be connected to an external power source, said motor means driving said spindle assembly in rotation about said axis at a speed which may be followed by the unaided eye of an operator, indicator means connected between said power source and said motor means and responsive to the load requirements of said motor means so that said indicator means will indicate an out-of-balance condition of said mold assembly mounted on said spindle assembly as it is rotated.

2. A rotational casting machine as set forth in claim 1 wherein said spindle assembly is arranged to rotate said mold assembly about first and second axes, said second axis being rotated about said first axis, said motor means comprising first and second electrical motors driving said mold assembly about said first and second axes respectively, said indicator means comprises first and second visual electrical meter means responsive to the load requirements of said first and second motors respectively to visually indicate the condition of balance of said mold assembly about said first and second axes.

3. A rotational casting machine as set forth in claim 1 wherein the speed of said motor means is substantially independent of said load requirements.

4. A rotational casting machine as set forth in claim 3 wherein feedback speed control means are provided to maintain a desired motor speed, said motor means comprises a DC motor having an armature, and said indicator means comprises an ammeter measuring the average armature current through said motor.

5. A rotational casting machine including a spindle assembly adapted for mounting a mold assembly thereon, said spindle assembly arranged to rotate the mold assembly about first and second spindle axes, said first axis being substantially horizontal and said second axis being rotated about said first axis, first and second electrical DC motor means associated with said first and second spindle axes respectively to rotate said mold assembly about said axes through said spindle assembly, motor control circuit means comprising first and second speed control circuit means driving said first and second motor means respectively at independent speeds which correspond to spindle axis speeds which may be followed by the unaided eye of an operator, said speed control circuit means each including control rectifier means and speed feedback means to maintain a desired spindle axis speed and visual electrical meter means responsive to the load requirements of the associated motor means so that said meter means will indicate an out-of-balance condition of said mold assembly about its associated axis.

6. The method of balancing a rotational casting machine which includes driving a mold-supporting spindle assembly about a non-vertical rotational axis with an electric motor, measuring the variations in motor load with an electrical meter having a visual output while a mold assembly mounted on said spindle assembly is rotated about said axis, determining the magnitude of an unbalanced load produced by said mold assembly about said axis of said spindle assembly by observing the amplitude of the variation of said output, determining the angular position of said unbalanced load with respect to said axis by simultaneously observing the magnitude of said output and the angular position of said mold assembly, and minimizing said unbalanced load by minimizing the total product of mass and the mass moment-arm about said axis in accordance with the determination of said magnitude and angular position of said unbalanced load.

References Cited
UNITED STATES PATENTS

| | | | |
|---|---|---|---|
| 1,449,458 | 3/1923 | Sutermeister | 73—59 |
| 1,804,168 | 5/1931 | Keller | 73—462 |
| 3,446,043 | 5/1969 | Severance | 318—460X |

JAMES J. GILL, Primary Examiner

H. GOLDSTEIN, Assistant Examiner

U.S. Cl. X.R.

164—4